US010726330B2

United States Patent
Ferdman et al.

(10) Patent No.: US 10,726,330 B2
(45) Date of Patent: Jul. 28, 2020

(54) SYSTEM, METHOD, AND ACCELERATOR TO PROCESS CONVOLUTIONAL NEURAL NETWORK LAYERS

(71) Applicant: The Research Foundation for The State University of New York, Albany, NY (US)

(72) Inventors: Michael Ferdman, Stony Brook, NY (US); Peter Milder, Sound Beach, NY (US); Manoj Alwani, Jersey City, NJ (US)

(73) Assignee: The Research Foundation for The State University of New York, Albany, NY (US)

( * ) Notice: Subject to any disclaimer, the term of this patent is extended or adjusted under 35 U.S.C. 154(b) by 0 days.

(21) Appl. No.: 16/335,801

(22) PCT Filed: Oct. 11, 2017

(86) PCT No.: PCT/US2017/056144
§ 371 (c)(1),
(2) Date: Mar. 22, 2019

(87) PCT Pub. No.: WO2018/071546
PCT Pub. Date: Apr. 19, 2018

(65) Prior Publication Data
US 2019/0220734 A1    Jul. 18, 2019

Related U.S. Application Data

(60) Provisional application No. 62/406,446, filed on Oct. 11, 2016.

(51) Int. Cl.
*G06N 3/063* (2006.01)
*G06N 3/04* (2006.01)
*G06F 17/15* (2006.01)

(52) U.S. Cl.
CPC ............. *G06N 3/063* (2013.01); *G06F 17/15* (2013.01); *G06N 3/0454* (2013.01)

(58) Field of Classification Search
CPC .................................. G06N 3/063; G06F 17/15
See application file for complete search history.

(56) References Cited

U.S. PATENT DOCUMENTS

2013/0120393 A1    5/2013   Winnemoeller et al.
2014/0348337 A1   11/2014   Franck et al.

FOREIGN PATENT DOCUMENTS

EP            0445456 A1    11/1991

OTHER PUBLICATIONS

Atul Rahman, Jongeun Lee, and Kiyoung Choi, "Efficient FPGA Acceleration of Convolutional Neural Networks Using Logical-3D Compute Array", Mar. 2016, 2016 Design, Automation & Test in Europe Conference & Exhibition (DATE), pp. 1393-1398. (Year: 2016).*

(Continued)

*Primary Examiner* — Kamran Afshar
*Assistant Examiner* — Ying Yu Chen
(74) *Attorney, Agent, or Firm* — Hoffmann & Baron, LLP

(57) ABSTRACT

System, method, and accelerator to process a convolutional neural network. In accordance therewith, a tile structure having input data values is loaded for a convolution layer. Each tile of the tile structure corresponds to a respective feature map in a set of input feature maps. The tile structure of each iteration represents a different subset of data values in the input feature maps. Intermediate data values associated with a subset of the data values of the input feature maps in the current intermediate tile structure are reused, when the intermediate data values of a previous tile structure overlap values to be computed in the current tile structure. Intermediate non-overlapping data values that are associated (Continued)

with the subset of the data values in the current tile structure are computed using associated filters having weight data values. Available reused intermediate data values and computed intermediate data values are buffered as intermediate data.

20 Claims, 7 Drawing Sheets

(56) References Cited

OTHER PUBLICATIONS

Chen Zhang, Peng Li, Guangyu Sun, Yijin Guan, Bingjun Xiao, Jason Cong, "Optimizing FPGA-based Accelerator Design for Deep Convolutional Neural Networks", Feb. 22, 2015, FPGA'15, pp. 161-170. (Year: 2015).*

Tianshi Chen, Zidong Du, Ninghui Sun, Jia Wang, Chengyong Wu, Yunji Chen, and Olivier Temam. "DianNao: A Small-Footprint High-Throughput Accelerator for Ubiquitous Machine-Learning", Feb. 4, 2014, ASPLOS '14, pgs. 269-283. (Year: 2014).*

Chen, Yunji, et al., "DaDianNao: A Machine-Learning Supercomputer", 2014 47th Annual IEEE/ACM International Symposium on Microarchitecture (MICRO-47), IEEE Computer Society, Washington, DC, USA.

International Search Report and Written Opinion issued in International Application No. PCT/US2017/056144 dated Jan. 5, 2018.

Agrawal, Pulkit, et al., "Analyzing the Performance of Multilayer Neural Networks for Object Recognition", European Conference on Computer Vision 2014, (arXiv:1407.1610v2 [cs.CV].

Ovtacharov, Kalin, et al., "Accelerating Deep Convolutional Neural Networks Using Specialized Hardware", Microsoft Research, Feb. 22, 2015.

Qiao, Yuran, et al., "FPGA-accelerated deep convolutional neural networks for high throughput and energy efficiency", Concurrency and Computation: Practice and Experience, Concurrency Computat.: Pract. Exper. 2017; 29:e3850.

Zhang, Chen, et al., "Optimizing FPGA-based Accelerator Design for Deep Convolutional Neural Networks", FPGA '15: Proceedings of the 2015 ACM/SIGDA Intl. Symposium on Field-Programmable Gate Arrays, Feb. 2015, pp. 161-170.

Suda, Naveen, et al., "Throughput-Optimized OpenCL-based FPGA Accelerator for Large-Scale Convolutional Neural Networks" FPGA '16: Proceedings of the 2016 ACM/SIGDA Intl. Symposium on Field-Programmable Gate Arrays, Feb. 2016, pp. 16-25.

Alwani, Manoj, "Fused Convolutional Neural Network Accelerators",thesis presented by Manjo Alwani to the Graduate School in partial fulfillment of the Requirements for the Degree of Master of Science in Computer Science, Stony Brook University, Dec. 2015.

* cited by examiner

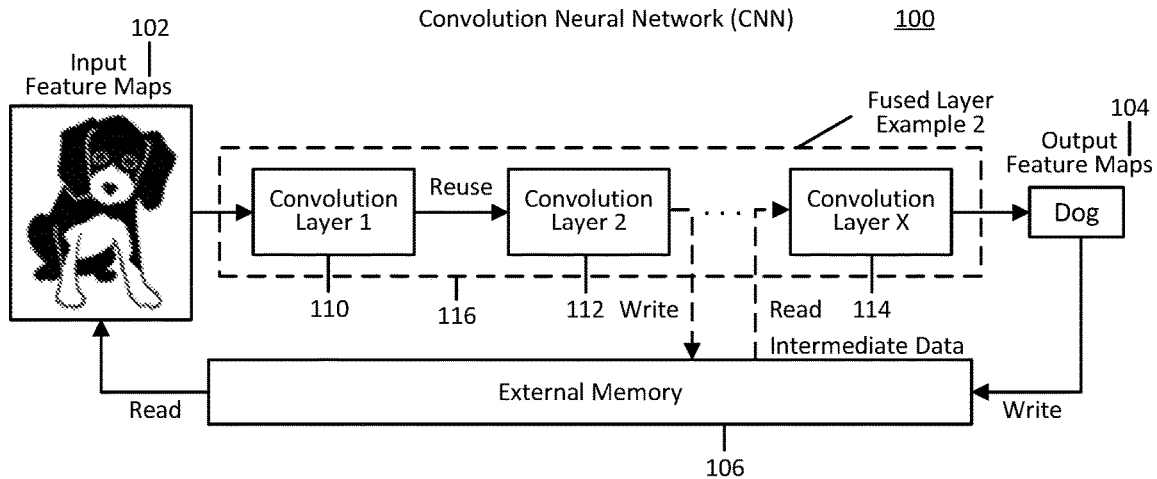
FIG. 1C
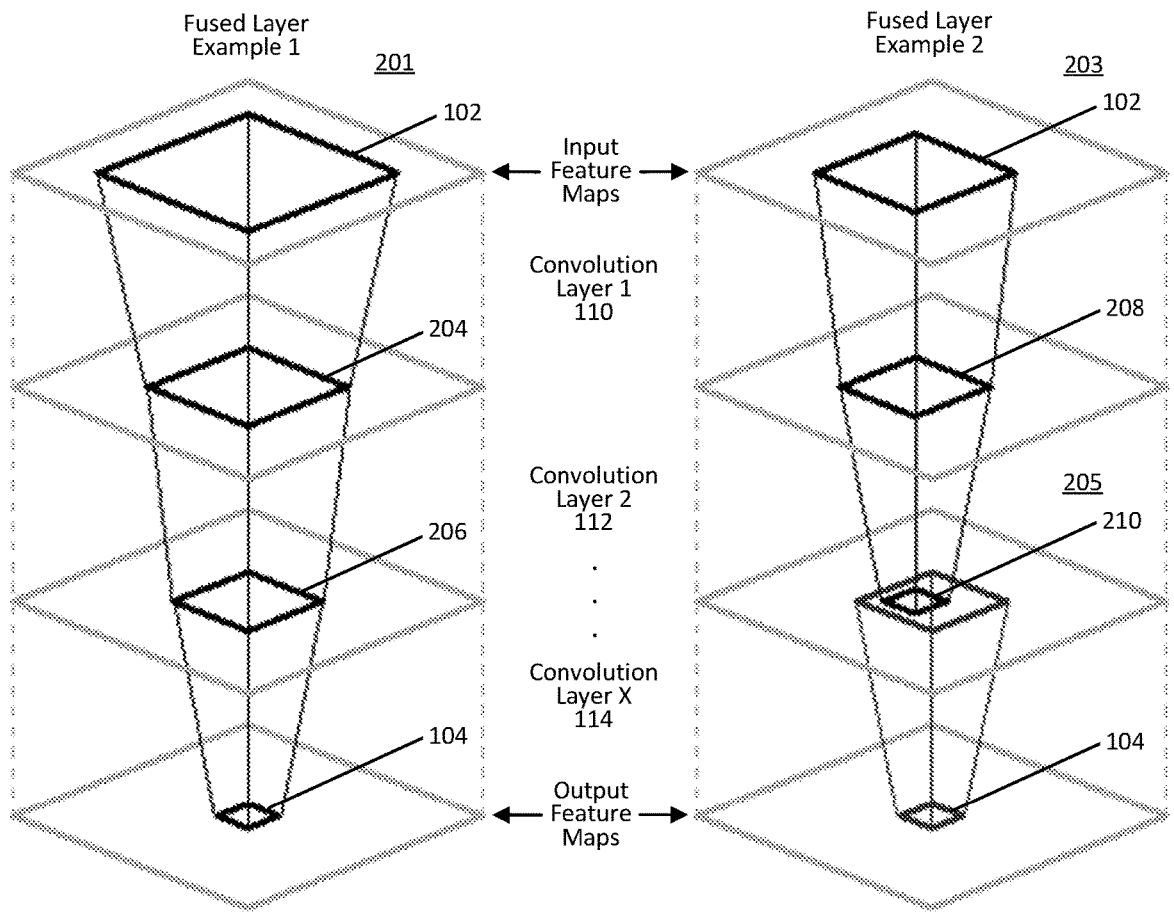
FIG. 2A
FIG. 2B

SYSTEM, METHOD, AND ACCELERATOR TO PROCESS CONVOLUTIONAL NEURAL NETWORK LAYERS

CROSS-REFERENCE TO RELATED APPLICATIONS

The present application is the U.S. National Phase of PCT/US2017/056144, filed on Oct. 11, 2017, which claims benefit of U.S. Provisional Patent Application No. 62/406,446, filed on Oct. 11, 2016, the entire contents of which are incorporated herein by reference in their entirety.

STATEMENT OF GOVERNMENT RIGHTS

This invention was made with government support under grant no. CCF1453460 awarded by the National Science Foundation. The government has certain rights in the invention.

BACKGROUND

Field

The present application relates to convolutional neural networks or CNNs. More particularly, the application is directed to a system, method, and accelerator to process convolutional neural network layers.

Brief Discussion of Related Art

Deep learning is a branch of machine learning that processes data in multiple layers to model high-level abstraction of the data and increase prediction accuracy. There are various deep learning networks such as convolution neural networks, deep belief networks, and recurrent neural networks, which have been applied in fields like computer vision, natural language processing, and bioinformatics, where these networks have achieved state-of-the-art results in connection with various tasks.

Deep convolutional neural networks (CNNs) have revolutionized the accuracy of recognition in computer vision. More broadly, this is part of a trend—using CNNs with many layers—that has been instrumental to rapid progress in the accuracy of natural language processing, information retrieval, speech recognition, and fraud detection.

Underlying the accuracy improvements of CNNs are massive increases in processing requirements. With each newly developed network, as the accuracy of recognition increases, the number of computations required to evaluate the network also grows. General-purpose central processing units (CPUs) have become a limiting factor for modern CNNs because of the lack of computational parallelism. In this regard, there has been interest in developing hardware accelerators for CNNs, such as graphical processing units (GPUs), field programmable gate arrays (FPGAs), and application specific integrated circuits (ASICs).

Although CNN computation is mathematically straightforward, the sheer volume of operations precludes a dataflow implementation even for a single convolution layer. More specifically, each convolution layer requires iterative use of available compute units. Research into the design of CNN accelerators has therefore concentrated on developing a CNN "building block" that can iteratively evaluate the network. In this regard, a number of methodologies have been developed for optimizing the architecture of such CNN accelerator building blocks, concentrating either on specific constraints, or evaluating the design space of compute units and memory bandwidth.

Traditional processing of a CNN network, whether in hardware or software implementations, evaluates the network structure one layer at a time. FIG. 1A illustrates such a prior art convolutional network that evaluates convolution layers 1, 2, . . . , and X. However, this traditional approach produces a large amount of intermediate data in hidden layers that are written off chip to an external memory as output of processing the CNN layers, as shown with the write edges in FIG. 1A. In this regard, a layer that is generated as a result of processing a CNN layer is called a hidden layer. The intermediate data of the hidden layer associated with processing a certain CNN layer is read from external memory as input associated with processing a subsequent CNN layer, as shown with the read edges in FIG. 1A. As the size of CNNs grows, the amount of hidden layer data that must be written out to external memory and read from external memory results in memory-bandwidth limitations, thus limiting performance gains even when more computational resources are made available, such as faster CPUs in software implementations or more compute units in hardware implementations.

As aforementioned, deep CNNs are rapidly becoming a dominant approach to computer vision and a major component of many other pervasive machine learning tasks, such as speech recognition, natural language processing, and fraud detection. As a result, systems and methods that can efficiently evaluate CNNs are also rapidly growing in popularity. As also aforementioned, the traditional approach to CNN implementations, whether in hardware or software, has been to focus on iterative processing of CNN layers, as shown in FIG. 1A. However, when processing each CNN layer to completion, the particular CNN implementations must use off-chip external memory to store intermediate data between the CNN layers because the intermediate data are too large to fit in on-chip buffer(s).

In addition to the foregoing, there are other reasons for systems and methods that can efficiently evaluate CNNs, such saving energy and/or saving computing memory during network training for CNN implementations.

It is therefore desirable to provide a system, method, and accelerator, which can process convolutional neural network layers, while mitigating transfers of intermediate data off chip to and from external memory.

SUMMARY

In accordance with an embodiment, disclosed herein is a system to process a convolutional neural network. The system includes a processor device, and a memory device to storing instructions that, when executed by the processing device, cause the processing device to perform the following operations.

The operations include loading for a convolution layer a current three-dimensional tile structure having a plurality of input data values. Each tile of the current three-dimensional tile structure corresponds to a respective feature map in a set of input feature maps. The current three-dimensional tile structure of each iteration represents a different subset of data values in the set of input feature maps.

The operations also include reusing intermediate convolved data values that are associated with a subset of the data values of the set of input feature maps in the current three-dimensional tile structure, when the intermediate convolved data values of a previous three-dimensional tile structure overlap values to be computed in the current three-dimensional tile structure.

The operations further include computing intermediate non-overlapping convolved data values that are associated with the subset of the data values in the current three-dimensional tile structure using associated filters having a plurality of weight data values.

The operations still further include buffering reused intermediate convolved data values when available and computed intermediate convolved data values as intermediate data.

The operations can further include buffering the intermediate data in an on-chip buffer. The on-chip buffer can be a cache or a scratchpad of a processor, a block random access memory of a field programmable gate array, or a static random access memory of an application specific integrated circuit.

The operations can further include: determining whether there is a further convolutional layer to process; selecting buffered intermediate data as the set of input feature maps; and repeating operations of reusing, computing, and buffering for the further convolutional layer.

The operations further include: determining whether there is a further convolutional layer to process; and writing buffered intermediate data to a set of output feature maps when there is no further convolutional layer to process. The buffered intermediate data can be written to external memory.

The operations can further include: determining whether there is a further three-dimensional tile structure in the set of input feature maps to process for a first convolutional layer; and repeating operations of reusing, computing, and buffering for the further three-dimensional tile structure of the first convolutional layer.

The operations can further comprise loading the current three-dimensional tile structure from external memory.

In accordance with another embodiment, disclosed herein is a method of processing a convolutional neural network. The method includes loading for a convolution layer a current three-dimensional tile structure having a plurality of input data values. Each tile of the current three-dimensional tile structure corresponds to a respective feature map in a set of input feature maps. The current three-dimensional tile structure of each iteration represents a different subset of data values in the set of input feature maps.

The method also includes reusing intermediate convolved data values that are associated with a subset of the data values of the set of input feature maps in the current three-dimensional tile structure, when the intermediate convolved data values of a previous three-dimensional tile structure overlap values to be computed in the current three-dimensional tile structure.

The method further includes computing intermediate non-overlapping convolved data values that are associated with the subset of the data values in the current three-dimensional tile structure using associated filters having a plurality of weight data values.

The method still further includes buffering reused intermediate convolved data values when available and computed intermediate convolved data values as intermediate data.

The method can further include buffering the intermediate data in an on-chip buffer. The on-chip buffer can be a cache or a scratchpad of a processor, a block random access memory of a field programmable gate array, or a static random access memory of an application specific integrated circuit.

The method can further include: determining whether there is a further convolutional layer to process; selecting buffered intermediate data as the set of input feature maps; and repeating operations of reusing, computing, and buffering for the further convolutional layer.

The method can further include: determining whether there is a further convolutional layer to process; and writing buffered intermediate data to a set of output feature maps when there is no further convolutional layer to process. The buffered intermediate data can be written to external memory.

The method can further include: determining whether there is a further three-dimensional tile structure in the set of input feature maps to process for a first convolutional layer; and repeating operations of reusing, computing, and buffering for the further three-dimensional tile structure of the first convolutional layer.

The method can further comprise loading the current three-dimensional tile structure from external memory.

In accordance with a further embodiment, disclosed herein is an accelerator to process a convolutional neural network. The accelerator includes a plurality of convolutional layers. Each of the convolutional layers includes an on-chip buffer, a reuse unit, and a compute unit.

The on-chip buffer is configured to load a current three-dimensional tile structure having a plurality of input data values. Each tile of the current three-dimensional tile structure corresponds to a respective feature map in a set of input feature maps. The current three-dimensional tile structure of each iteration represents a different subset of data values in the set of input feature maps.

The reuse unit is configured to reuse intermediate convolved data values that are associated with a subset of the data values of the set of input feature maps in the current three-dimensional tile structure, when the intermediate convolved data values of a previous three-dimensional tile structure overlap data values to be computed in the current three-dimensional tile structure.

The compute unit is configured to compute intermediate non-overlapping convolved data values that are associated with the subset of the data values in the current three-dimensional tile structure using associated filters having a plurality of weight data values, and to buffer reused intermediate convolved data values when available and computed intermediate convolved data values as intermediate data in an on-chip buffer of a further convolutional layer or an output on-chip buffer of the accelerator.

In accordance with the accelerator, the current three-dimensional tile structure can be loaded from an external memory to the on-chip buffer.

Further in accordance with the accelerator, the buffered intermediate data can be written from the output on-chip buffer to a set of output feature maps in an external memory.

The convolutional layers of the accelerator are configured to be processed in a pipeline so as to overlap processing of the plurality of convolutional layers.

These and other purposes, goals, and advantages of the present application will become apparent from the following detailed description read in conjunction with the accompanying drawings.

BRIEF DESCRIPTION OF DRAWINGS

The accompanying drawings are presented to aid in the description of embodiments set forth in the present application and are provided solely for the illustration of the embodiments and not limitation thereof. In the following drawings:

FIG. 1B and FIG. 1C illustrate example fused layer convolutional neural networks that accelerate processing of CNN layers and mitigate transfers of intermediate data off chip to and from external memory;

FIG. 2A and FIG. 2B illustrate partitioning of the convolutional neural network illustrated in FIG. 1B and FIG. 1C into example pyramids of fused convolution layers in accordance with the fused layer examples illustrated in FIG. 1B and FIG. 1C;

DETAILED DESCRIPTION

Described herein are a system, method, and an accelerator that accelerate the processing of convolutional neural network layers. The various embodiments will be described in detail with reference to the accompanying drawings.

Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure.

Additionally, well-known elements of the disclosure will not be described in detail or will be omitted so as not to obscure the relevant details of the disclosure. For example, there are additional intermediate layers, such as activation layer, padding layer, and pooling layer, which can be interspersed between the convolutional layers and which are also fused in the fused layer convolutional neural network. However, such intermediate layers are well known and will not be described in detail hereinafter.

Figure 1A:
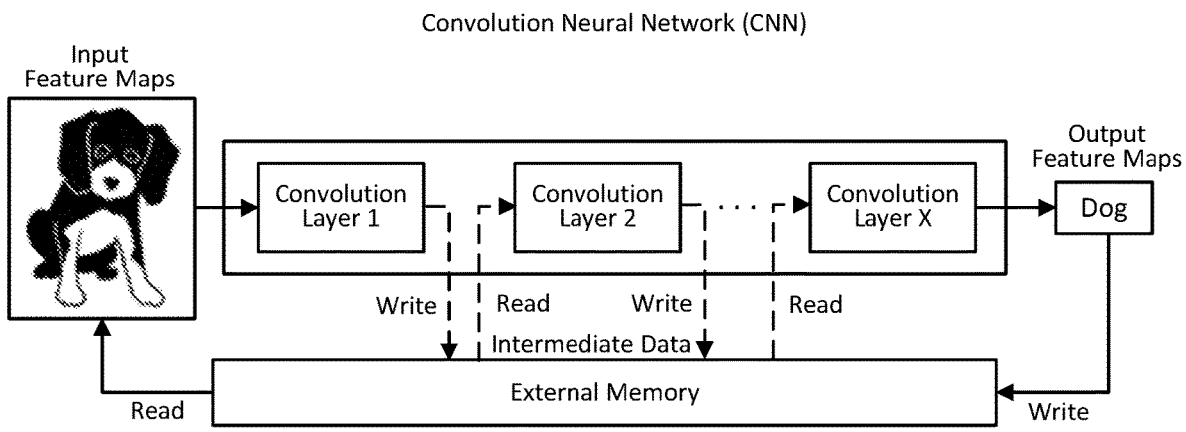
FIG. 1A illustrates a prior art convolutional neural network which processes CNN layers in a conventional layer-by layer manner that transfers intermediate data to and from external memory in connection with processing of each convolutional layer.
Figure 1B:
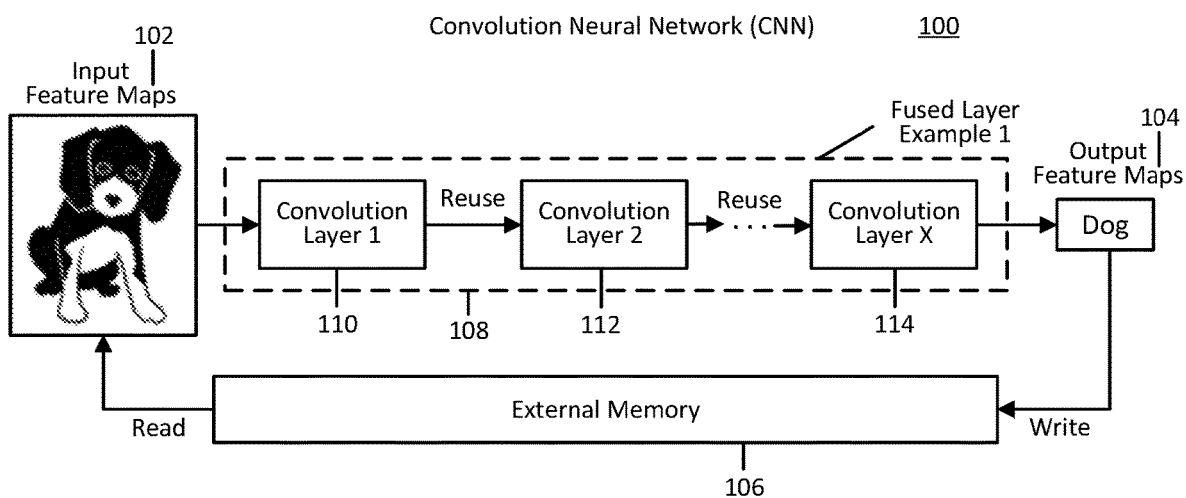

FIG. 1B and FIG. 1C illustrate examples of fused layer convolutional neural network 100 that accelerate processing of CNN layers and mitigates transfers of intermediate data off chip to and from external memory 106.

As used herein, on-chip memory is generally a high-bandwidth memory that is specialized for holding and accessing temporary data or information, such as a cache or a scratchpad of a CPU or a GPU, a block random access memory (RAM) of a FPGA, or a static RAM of an ASIC. In contrast, off-chip or external memory 106 is a bulk-type storage memory for holding data or information, which is generally of constrained-bandwidth or slower-bandwidth than the on-chip memory. While the dichotomy of on-chip and off-chip (external) is used herein for brevity and clarity, it should be noted that the external memory 106 may not be off-chip or external, such as for example an on-chip embedded dynamic-random access memory (eDRAM) (e.g., same chip and/or same package), or a stacked chip with high-bandwidth memory (HBM).

The convolutional neural network 100 in FIG. 1B and FIG. 1C illustrates several fused layer examples 108, 116 of convolutional layers 110 (convolutional layer 1), 112 (convolutional layer 2), . . . , and 114 (convolutional layer X). More specifically, all convolutional layers 110, 112, . . . , 114 are fused in the first fused layer example 108, while only the first two convolutional layers 110, 112 are fused in the second fused layer example 116.

In the fused layer convolutional neural network 100, input feature maps 102—associated with and generated for a certain image or representation (e.g., image of a dog)—are read from external memory 106 for processing. Convolutional layer 110 receives the input feature maps 102 as the input, and processes the input feature maps to produce first intermediate feature maps as the output (not shown in FIG. 1B and FIG. 1C). Moreover, convolutional layer 112 receives the first intermediate feature maps as the input, and processes the first intermediate feature maps in order to produce second intermediate feature maps as the output (not shown in FIG. 1B and FIG. 1C).

In the first fused layer example 108, convolutional layer 114 receives the second intermediate feature maps as the input, and processes the second intermediate feature maps in order to produce output feature maps 104 as the output. However, in the second fused layer example 116, the convolutional layer 112 writes the second intermediate feature maps as the output to external memory 106, the convolutional layer 114 reads the second intermediate feature maps as the input feature maps, and processes these input feature maps in order to produce output feature maps as the output 104 according to, for example, conventional CNN layer-by-layer processing. In both examples 108, 116, the output feature maps 104 are written to the external memory 106.

As will be described in greater detail below with reference to FIGS. 3A-3D, the feature-map data in the feature maps of the fused convolutional layers 110, 112, . . . , 114 in the first example 108, or the fused convolutional layers 110, 112 in the second fused layer example 116, can be processed iteratively across all of the fused convolutional layers in three-dimensional tile structures.

Unlike the conventional CNN layer-by-layer methodology as illustrated in FIG. 1A, which processes each CNN layer independently through to completion, reading and writing the intermediate data between convolutional layers off chip to and from the external memory, the fused layer convolutional neural network 100 exploits inter-layer data locality among feature-map data (e.g., the three-dimensional tile structures) of the convolutional layers such that already processed intermediate data of the first convolutional layer 110 can be reused by the second convolutional layer 112, and so on with other fused convolutional layers, without reading and writing intermediate data between convolutional layers off chip to and from the external memory 106.

It should be noted that while only three convolutional layers are shown in FIG. 1B and FIG. 1C for illustrative purposes, the convolutional neural network 100 can include a plurality of additional convolutional layers, as indicated with the ellipses in FIG. 1B and FIG. 1C. In this regard, the first fused layer example 108 can include one or more additional convolutional layers that can be processed according to the fused-layer methodology, as described with reference to the first fused layer example 108. Similarly, the second fused layer example 116 can also include one or more additional convolutional layers after the read and write of intermediate data to external memory 106, such as convolutional layer 114, which can be processed according to conventional CNN layer-by-layer methodology or according to the fused-layer methodology, as described with reference to the first fused layer example 108.

As illustrated in the fused layer examples 108, 116 of FIG. 1B and FIG. 1C, the key to accelerating processing of the convolutional neural network 100 is restructuring the conventional CNN layer-by-layer processing with fusion of adjacent CNN layers and iterative processing across all of the fused layers using data regions of feature-map data (e.g., three-dimensional tile structures) that exploit inter-data locality among the fused layers, which largely eliminates intermediate data transfer off chip to and from the external memory 106. More specifically, a three-dimensional tile structure of the input feature maps 102 is an input data region from which other data regions, which can also be three-dimensional tile structures, of the intermediate feature maps of the fused convolution layers depend.

Accordingly, as a certain data region of the input feature maps 102 is processed, successive intermediate data regions of all other fused convolution layers that depend on that data region are also processed as follows, without writing intermediate data off chip to external memory 106. Only the output feature maps 104 of the last fused layer 114 are written off chip to external memory 106. More specifically, an output data region of intermediate feature maps computed and outputted by a convolutional layer depends only on an input data region of input feature maps that are inputted to that convolutional layer. The exploitation of this data locality in the fused layer dataflow of the fused layer convolutional neural network 100 allows the data to be passed directly from one convolutional layer to the next, without writing and reading the intermediate data to and from the external memory 106. This fusion of convolutional layers will be described in greater detail below with reference to FIGS. 3A-3D.

FIG. 2A and FIG. 2B illustrate partitioning of the convolutional neural network 100 illustrated in FIG. 1B and FIG. 1C into example pyramids 201, 203 of fused convolution layers in accordance with the fused layer examples 108, 116 illustrated in FIG. 1B and FIG. 1C. As used herein, the term pyramid refers to an inverted pyramid shape of a computational window that spans across the fused convolutional layers of the convolutional neural network 100.

As illustrated for the first fused layer example 108, the convolutional neural network 100 is partitioned such that all of the convolutional layers 110, 112, . . . , 114 are fused into one example pyramid 201, with fused dataflow of the pyramid 201 from input feature maps 102, through intermediate feature maps 204, 206, and to output feature maps 104. The input feature maps 102 are read from the external memory 106, processed iteratively through the example pyramid 201, and the output feature maps 104 written to the external memory 106.

As illustrated for the second fused layer example 116, the convolutional neural network 100 is partitioned such that only convolutional layers 110 and 112 are fused into example pyramid 203, while convolutional layer 114 is not fused in example pyramid 205. The fused dataflow of the pyramid 203 is from input feature maps 102, through intermediate feature maps 204, and to output feature maps 210, with input feature maps 102 being read from the external memory 106, processed iteratively through the example pyramid 203, and output feature maps 210 being written to external memory 106. The non-fused data flow of the pyramid 205 is from output feature maps 210 (i.e., input feature maps in the dataflow of the pyramid 205) to output feature maps 104, with output feature maps 210 being read as input feature maps from the external memory 106, processed through the example pyramid 205 in a conventional manner, and output feature maps 104 being written to external memory 106.

While the convolutional neural network 100 can be partitioned into the non-fused pyramid 205, it should be noted that the convolutional neural network 100 can be partitioned such that pyramid 205 includes multiple convolution layers that are fused. In such a case, the pyramid 205 would fuse these convolution layers analogously to the fused pyramid 201.

Although the foregoing examples illustrate fusing a certain number of convolutional layers, it should be noted that fusing a greater number of layers in one or more pyramids is analogous. As the number of fused layers increases, the benefits increase (e.g., the reduction of intermediate data transferred to and from external memory 106), but so do the costs (e.g., the increase in on-chip memory required).

Accordingly, there is a tradeoff between the costs incurred and the benefits obtained. In the case where all convolutional layers are fused into a single pyramid, the costs of on-chip memory increase by the largest amount but save the most bandwidth in writing and reading from external memory, as illustrated in the second fused layer example in FIG. 2A. As an example, a certain five-layer convolutional neural network that is fused into a single pyramid can reduce by 95% the external memory bandwidth requirements in exchange for only 20% of extra on-chip memory (e.g., convolutional neural network called VGGNet-E). On balance, this represents a significant acceleration of the processing of convolutional layers in the convolutional neural network. However, other cost/benefit tradeoffs can be chosen, in terms of efficiencies in processing, energy, memory capacity, decomposing the fusion of the convolutional layers using more than one pyramid, as illustrated in the second fused layer example in FIG. 2B. The tradeoff can be especially useful in convolutional neural networks that have many convolutional layers.

As illustrated in FIG. 2A, all convolutional layers 110, 112, . . . , and 114 are fused into a single pyramid 201 in accordance with the first fused layer example 108, which requires minimum data transfer, i.e., only the input feature maps 102 for convolutional layer 110 are loaded from the external memory 106 and the output feature maps are written to the external memory 106. However, the sizes of the feature maps and sizes of three-dimensional tile structures associated with the feature maps of all convolutional layers 110, 112, . . . , and 114 will require increased on-chip storage.

As illustrated in FIG. 2B, the convolutional layers 110, 112, . . . , and 114 can be decomposed into two pyramids 203, 205. This organization of the convolutional neural network 100 will require greater off-chip transfer to external memory 106 because the output of convolutional layer 112 of the first pyramid 203 must be written off chip to external memory 106 and then read back on-chip in order to process output feature maps 210 through convolution layer 114 of the second pyramid 205. The benefit of the multi-pyramid approach is that the sizes of the feature maps and sizes of three-dimensional tile structures associated with the feature maps of the convolutional layers 110, 112, . . . , and 114 will require decreased on-chip storage.

In this way, a continuum of tradeoffs can be considered: at one extreme, all layers are fused into a single pyramid 201. At the other extreme, each convolutional layer is its own pyramid (not shown) that can be evaluated in the traditional layer-by-layer approach. And in the middle of the referenced extreme cases, the various pyramid structures can be considered for partitioning various convolutional neural networks, such as the example convolutional neural network 100 illustrated in FIG. 1B and FIG. 1C.

FIGS. 3A-3D illustrate an example series of feature maps illustrating the processing of the first two fused convolutional layers of the pyramids 201, 203 illustrated in FIGS. 2A and 2B in the convolutional neural network illustrated in FIG. 1B and FIG. 1C.

As illustrated in FIGS. 3A-3D, example convolutional layers 307, 309 are fused together. While the discussion hereinafter focuses on the specifics in fusing these convolutional layers, the general fusion principle is applicable across any given number of convolutional layers of any convolutional neural network, such as the example convolutional layers 110, 112, . . . , and 114 of the convolutional neural network 100 illustrated in FIGS. 1B-2B.

Example input feature maps 302 are read into the first convolutional layer 307, such as from external memory 106. The input feature maps 302 include N different feature maps (e.g., N=3) of example size R×C (e.g., R=7 and C=7). More specifically, there are N-number of feature maps 302, with each of the feature maps 302 including R×C data elements 304. There are associated with the first convolutional layer 307, M-number of filters 306 of K×K×N weights (e.g., K=3). The filters 306 can be similarly read from external memory 106.

The N input feature maps 302 are convolved with M filters 306 to generate the example intermediate feature maps 308. The intermediate feature maps 308 are received by the second convolutional layer 309 from the first convolutional layer 307. The intermediate feature maps 308 include M different feature maps (e.g., M=3) of example size R'×C' (e.g., R'=5 and C'=5). More specifically, there are M-number of feature maps 308, with each of the feature maps 308 including R'×C' data elements 310. There are associated with the second convolutional layer 309, P-number of filters of L×L×M (e.g., L=3).

The M intermediate feature maps 308 are convolved with P filters 306 to generate the example output feature maps 314. The output feature maps 314 are written by the second convolutional layer 309, such as to the external memory 106. The output feature maps 314 include P different feature maps (e.g., P=3) of example size R"×C" (e.g., R"=3 and C"=3). More specifically, there are P-number of feature maps 314, with each of the feature maps 314 including R"×C" data elements 316.

As aforementioned, the convolutional layers 307, 309 convolve the respective feature maps 302, 308 with respective filters 306, 312. In this example, the filters 306, 312 are applied with stride S (e.g., S=1), which illustrates the foregoing examples with brevity and clarity. It is noted, however, that this stride is not a constraint of the convolutional layer fusion presented herein, and a different stride can be used instead (e.g., S=2).

The following description in view of FIGS. 3A-3D will particularly illustrate iterative convolutional processing with reuse by the convolutional layers 307, 309 of respective feature maps 302, 308 that are convolved with respective filters 306, 312, as illustrated in FIG. 2A.

In reasoning out the convolutional processing, an output data region (e.g., three-dimensional tile structure 322) is selected in the output feature maps 314, and then traced backwards through an intermediate data region of the intermediate feature maps 308 (e.g., three-dimensional tile structure 320), to an input data region (e.g., a three-dimensional tile structure 318) in the input feature maps 302 on which the output region of the output feature maps 314 depends. If the convolutional layers 307, 309 are visualized spatially, this convolutional processing of dependent data regions creates a pyramid across multiple convolutional layers 307, 309 of the feature maps 302, 308, and 314.

Figure 3A:
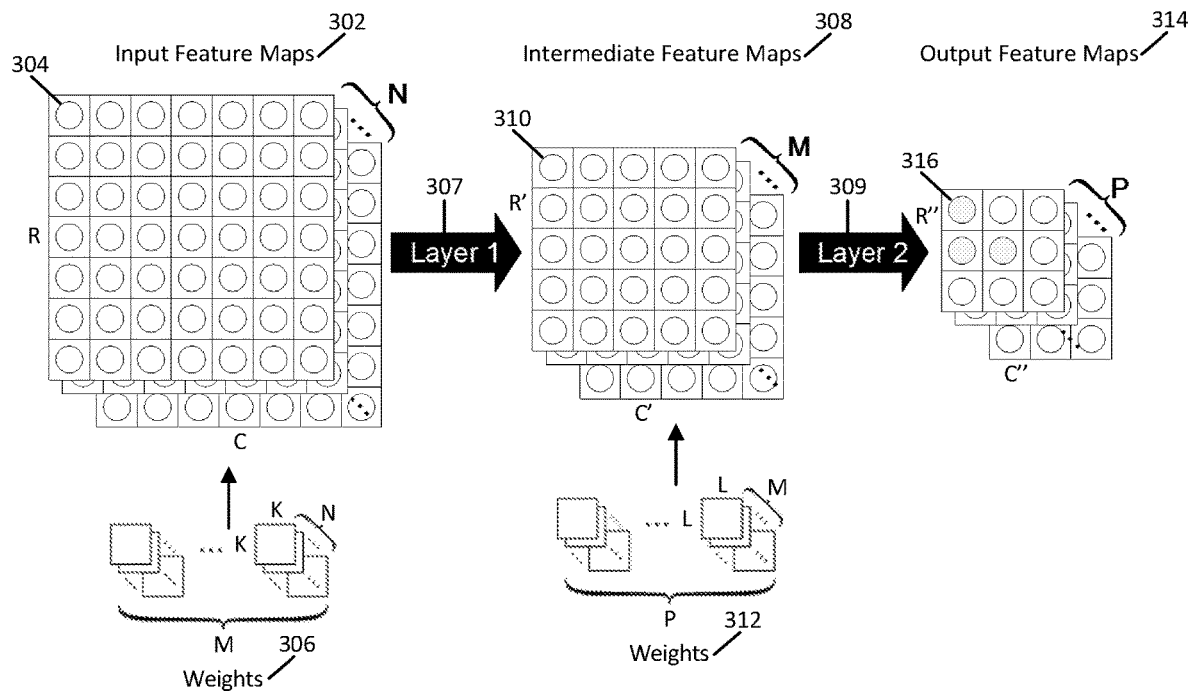
FIGS. 3A-3D illustrate an example series of feature maps illustrating the processing of the first two fused convolutional layers of the pyramids illustrated in FIGS. 2A and 2B in the convolutional neural network illustrated in FIG. 1B and FIG. 1C.
Figure 3B:
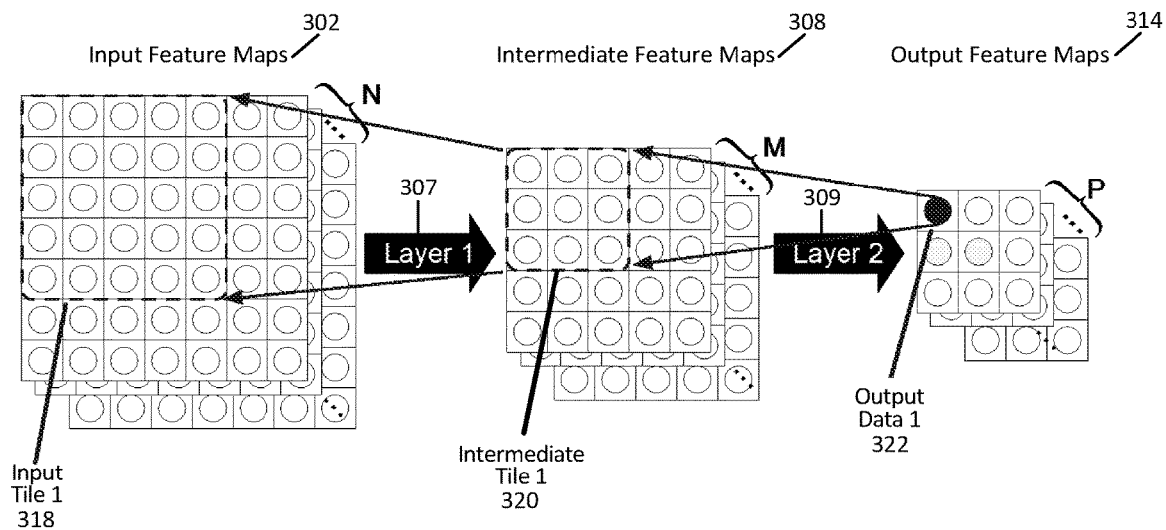

In accordance with FIG. 3B, the convolutional layer 307 reads the input three-dimensional tile structure 318 (e.g., dashed box labeled Input Tile 1) of its input feature maps 302, such as from external memory 106. The input three-dimensional tile structure 318 is considered as the base of the pyramid, includes 5×5×N input data values, and extends through all N input feature maps 302.

In this regard, 5×5×N data values are read from off-chip external memory 106 into one or more on-chip buffers. Convolutional layer 307 convolves these read data values (5×5×N) with M filters 306 (3×3×N) across the three-dimensional tile structure 318, producing the intermediate three-dimensional tile structure 320 (e.g., dashed box labeled Intermediate Tile 1). The intermediate three-dimensional tile structure 320 is considered the middle of the pyramid, includes 3×3×M intermediate data values, and extends through all M intermediate feature maps 308.

Furthermore, the 3×3×M data values are received on-chip from the one or more on-chip buffers. Convolutional layer 309 convolves these data values (3×3×M) with P filters 312 (1×1×M) across the intermediate three-dimensional tile structure 320, producing the output three-dimensional tile structure 322 (e.g., black circle labeled Output Data 1). The output three-dimensional tile structure 322 is considered the tip of the pyramid, includes 1×1×P output data values, and extends through all P output feature maps 314. The data values of the output three-dimensional tile structure 322 are stored to one or more on-chip buffers.

Accordingly, once the input three-dimensional tile structure 318 is read on-chip, the entire pyramid of intermediate data values can be processed (computed) without transferring any additional feature map data off chip to or from the external memory 106. When the tip of the pyramid is reached, the data values of the output three-dimensional tile structure 322 for the output feature maps 314 can be written from the one or more on-chip buffers to external memory 106.

Figure 3C:
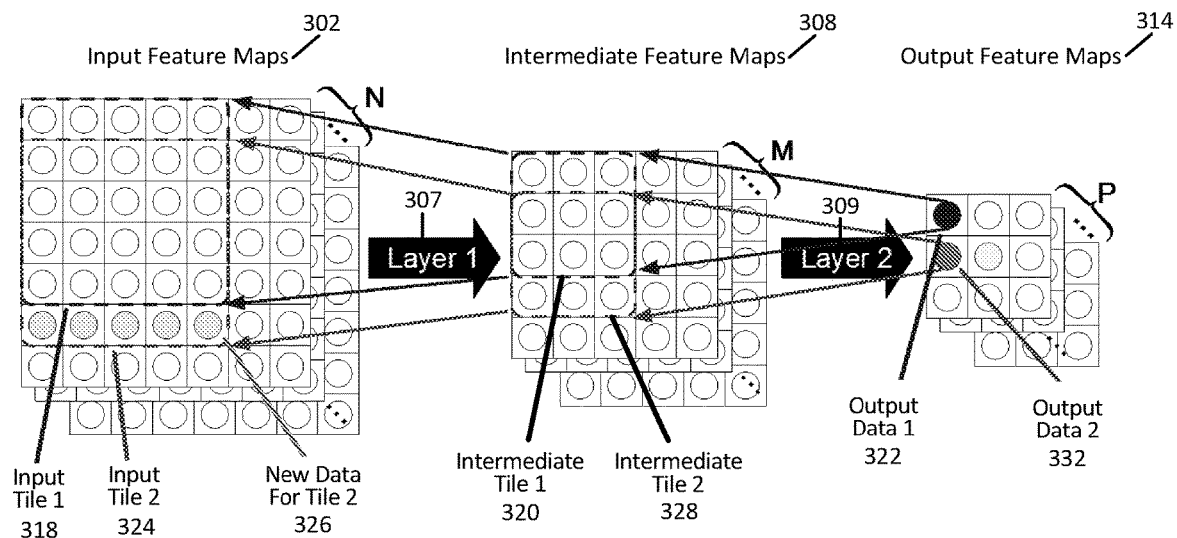
Figure 3D:
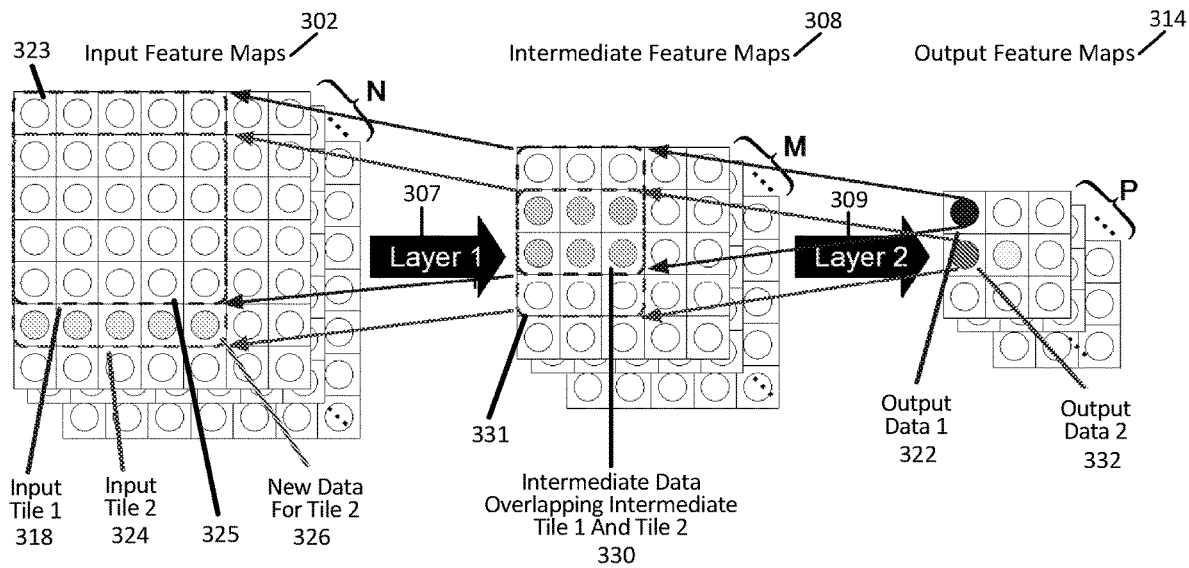

According to FIG. 3C, the convolutional layer 307 reads the input three-dimensional tile structure 324 (e.g., dashed box labeled Input Tile 2) for its input feature maps 302. However, it is not necessary to load the entire input three-dimensional tile structure 324 (considered the base of this pyramid) from external memory 106 in order to continue convolutional processing.

Instead, the top-most row of data 323 of the input three-dimensional tile structure 318 can be discarded, the overlapping data 325 of the input three-dimensional tile structure 318 that overlaps data in the input three-dimensional tile structure 324 can be reused as described below, and the new data 326 that does not overlap can be read, such as from the external memory 106, in order to form the input three-dimensional tile structure 324.

In this regard, 1×5×N new data values 326 of the input three-dimensional tile structure 324 are stored in an on-chip buffer. The convolutional layer 307 reuses intermediate overlapping data 330 that is associated with overlapping data 325 and convolves only the new data values (1×5×N)

with M filters 306 (3×3×N) across the three-dimensional tile structure 324, producing the intermediate three-dimensional tile structure 328 (e.g., dashed box labeled Intermediate Tile 2). As particularly illustrated in FIG. 3D, the convolutional layer 307 reuses already computed overlapping data 330 in intermediate three-dimensional tile structure 328 that is associated with the overlapping data 325 in intermediate three-dimensional tile structure 324, and convolves only the new data values 326 to produce associated intermediate data values 331 in the input three-dimensional tile structure 328. Similarly, the intermediate three-dimensional tile structure 328 is considered the middle of the pyramid, includes 3×3×M intermediate data values, and extends through all M intermediate feature maps 308.

Furthermore, the 3×3×M data values are received on-chip from the one or more on-chip buffers. Convolutional layer 309 convolves these data values (3×3×M) with P filters 312 (1×1×M) across the intermediate three-dimensional tile structure 328, producing the output three-dimensional tile structure 332 (e.g., grey circle labeled Output Data 2). The output three-dimensional tile structure 332 is considered the tip of the pyramid, includes 1×1×P output data values, and extends through all P output feature maps 314. The data values of the output three-dimensional tile structure 332 are stored to one or more on-chip buffers.

Accordingly, once the input three-dimensional tile structure 318 is read on-chip, the entire pyramid of intermediate and output data values can be processed (computed) without transferring any additional feature map data off chip to or from the external memory 106. When the tip of the pyramid is reached, the data values of the output three-dimensional tile structure 332 for the output feature maps 314 can be written from the one or more on-chip buffers to the external memory 106.

It should be noted that further output data values in the output three-dimensional tile structures of the output feature maps 314 are processed (computed) with the same iterative methodology as described hereinabove. In the foregoing example, the output feature maps 314 are completed after nine iterations through the respective pyramids of convolutional layers 307, 309.

As illustrated in FIGS. 3A-3D, some intermediate overlapping data values in the intermediate feature maps 308 (e.g., intermediate overlapping data values 330) are needed for computing the output three-dimensional tile structures in the output feature maps 314 (e.g., output three-dimensional tile structures 322, 332).

Because the first and second pyramids overlap, a certain number of the same intermediate data values can be used to process the output three-dimensional tile structures 322, 332 in the output feature maps 314. There are two possible approaches. On the one hand, the data values can be re-processed (re-computed) each time they are needed in the subsequent pyramid. On the other hand, the data values can be cached and then reused when processing the subsequent pyramid. Re-processing the data values can add significant extra cost in terms of additional convolutional operations, but also has the benefit of simplicity (e.g., each pyramid's internal dataflow is the same). However, caching the intermediate overlapping data values eliminates this extra processing, but requires on-chip buffering and makes the computation for each pyramid irregular because certain pyramids will perform more processing than some other pyramids.

It should be noted that in certain convolutional neural networks in which the number of computations is relatively small, the method of re-computing the data values can be useful. As an example, recurrent neural networks—which are applicable in natural language processing for language modeling—use small linear layers across multiple time steps. In such an example, it can be preferable to re-compute intermediate data values rather than store and reuse the intermediate data values. However, for typical convolutional neural networks applicable in computer vision applications, the costs of re-computation are prohibitive, while the storage costs of reuse are relatively small.

Figure 4:
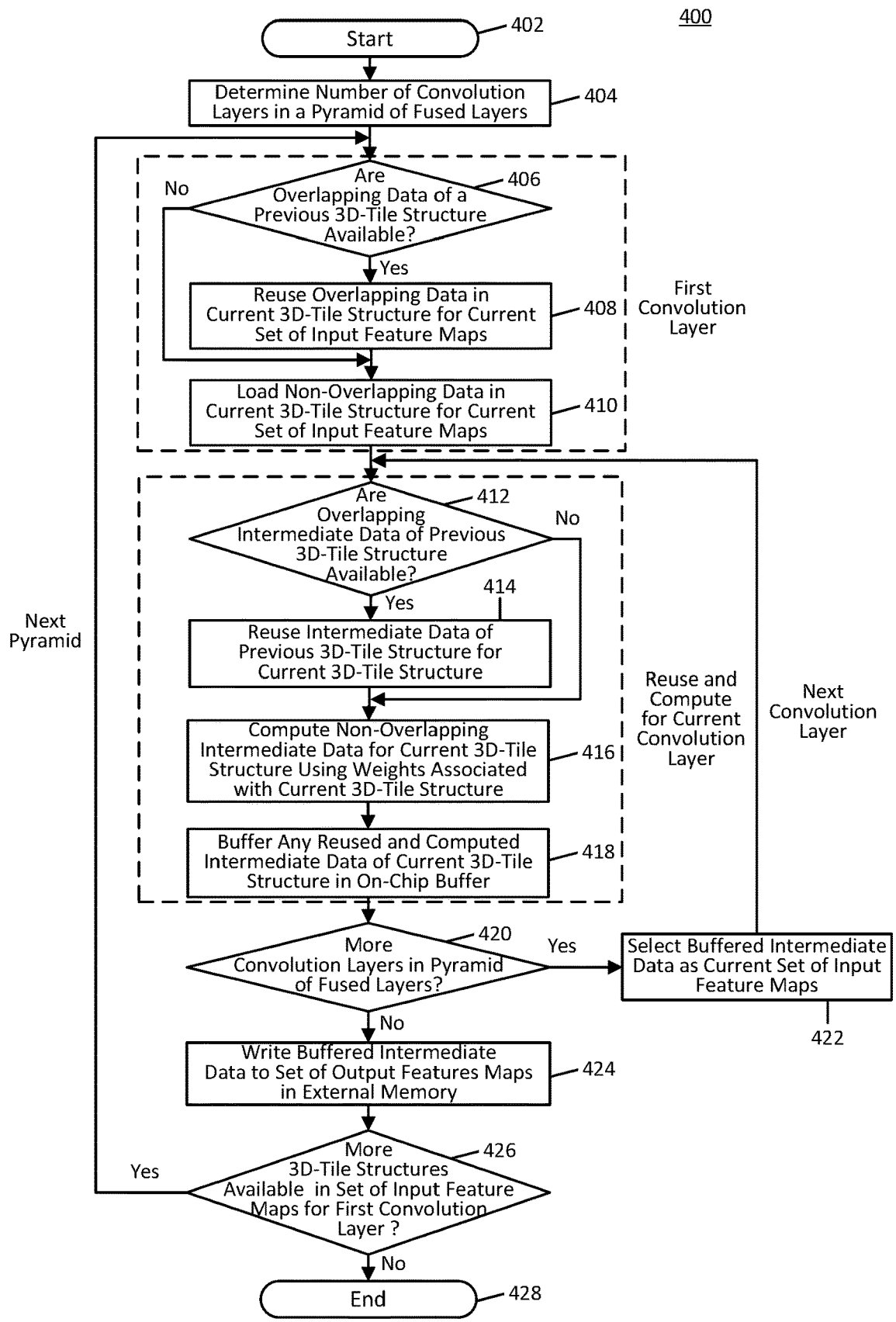
FIG. 4 illustrates a flowchart of an example method of accelerating processing of a convolutional neural network that includes at least one pyramid of fused CNN layers.

FIG. 4 illustrates a flowchart of an example method 400 of accelerating processing of a convolutional neural network that includes at least one pyramid of fused CNN layers.

The method 400 starts at operation 402 where the external memory 106 can be accessed for a set of input feature maps associated with a certain convolutional neural network. At operation 404, a number of convolutional layers in a pyramid of fused layers is determined for the convolutional neural network being processed.

At operations 406-410, a first or current three-dimensional tile structure of the pyramid is loaded for the current set of input feature maps from the external memory 106 as input to a first convolutional layer. As aforementioned, the first or current three-dimensional tile structure of the pyramid can be loaded into an on-chip buffer for processing.

More specifically, at operation 406 a determination is made as to whether there are any overlapping data of a previous three-dimensional tile structure available for reuse in connection with the current three-dimensional tile structure. If it is determined at operation 406 that there are overlapping data, then at operation 408 these data of the previous three-dimensional tile structure are reused for the current three-dimensional tile structure, i.e., without reloading of the data.

Alternatively, if it is determined at operation 406 that there are no overlapping data of a previous three-dimensional structure, then the method 400 continues at operation 410 where all non-overlapping data are loaded for the current three-dimensional tile structure.

At operations 412-418, any overlapping intermediate data are reused and non-overlapping intermediate data are computed for the first or current convolution layer. More specifically, at operation 412, a determination is made as to whether there are any overlapping intermediate data (convolved data) of a previous three-dimensional tile structure that are available for reuse in connection with the current three-dimensional tile structure. If it is determined at operation 412 that there are overlapping intermediate data, then at operation 414 these intermediate data of the previous three-dimensional tile structures are reused for the current three-dimensional tile structure, i.e., without re-computing the overlapping intermediate data.

Alternatively, if it is determined at operation 412 that there are no overlapping intermediate data of the previous three-dimensional structure, then the method 400 continues at operation 416 where all non-overlapping intermediate data are computed (convolved) for the current three-dimensional tile structure using weights that are associated with the current three-dimensional tile structure. Thereafter, at operation 418 any reused intermediate data and computed intermediate data are buffered in an on-chip buffer.

At operation 420, a determination is made as to whether there are more convolutional layers in the pyramid of fused layers. If it is determined at operation 420 that there are more convolutional layers in the pyramid of the convolutional neural network being processed, then at operation 422 the buffered intermediate data are selected as the current set of input feature maps. The method 400 then iterates through operations 412-420 for each subsequent convolutional layer in the pyramid of fused layers, until all fused layers of the pyramid are processed.

Alternatively, if it is determined at operation 420 that there are no more convolutional layers in the pyramid of the convolutional neural network being processed, then the method 400 continues at operation 424 where the last buffered intermediate data are written to the set of output feature maps in external memory 106.

At operation 426, a determination is made as to whether there are more three-dimensional tile structures in the set of input feature maps for processing for the first convolutional layer. If it is determined at operation 426 that there are more three-dimensional structures in the input feature maps of the first convolution layer for processing, then the method 400 iterates through operations 406-426 for each subsequent three dimensional structure in the set of input feature maps in order to process the next pyramid of fused layers, until all pyramids of the input features maps for the first convolutional layer have been processed.

Alternatively, if it is determined at operation 426 that there are no more three-dimensional tile structures in the set of input feature maps of the first convolutional layer for processing, the method then ends at operation 428. It should be noted that at the conclusion of the method 400, the complete set of input feature maps has been processed to produce a complete set of output feature maps for the certain convolutional neural network.

Figure 5:
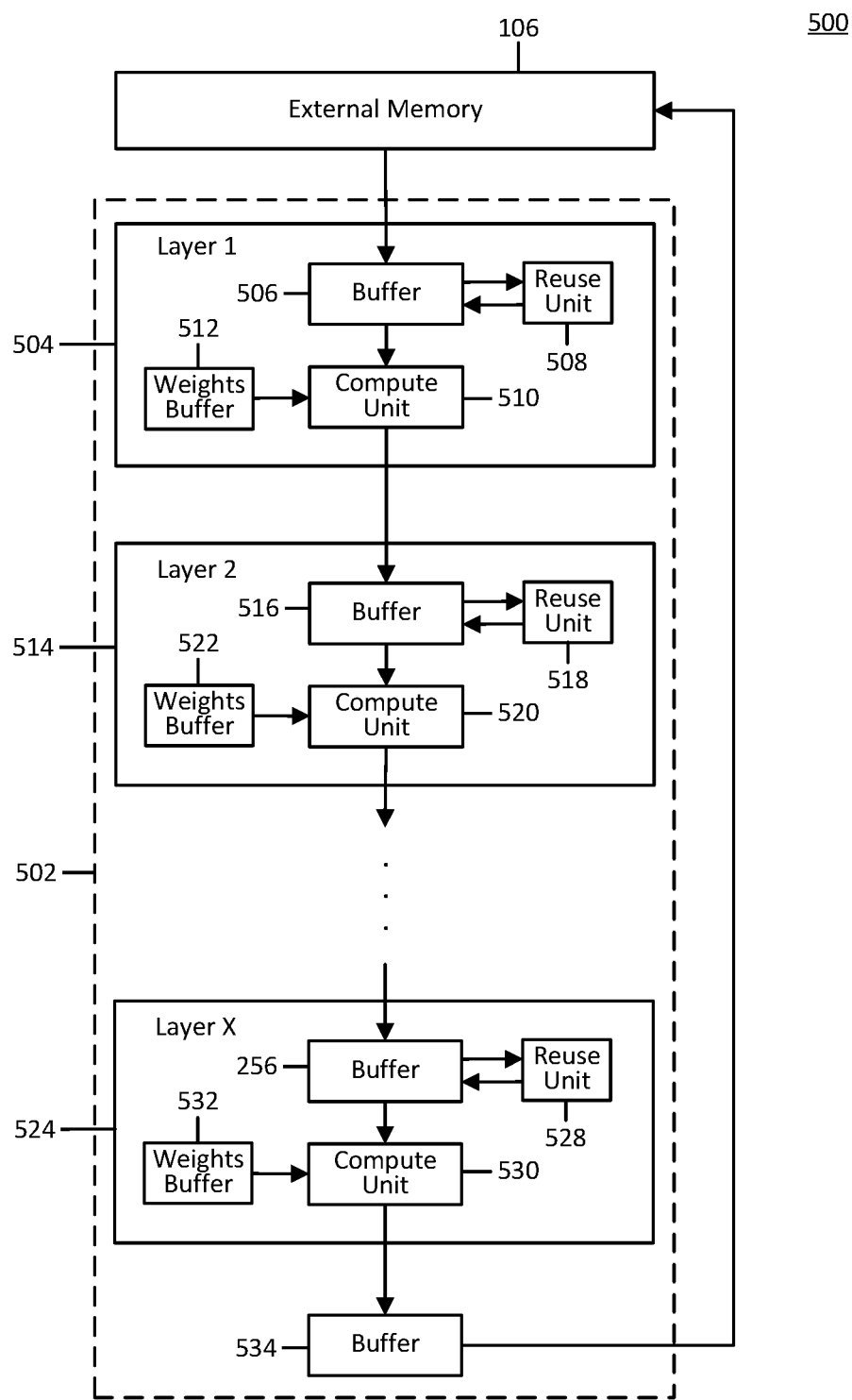
FIG. 5 illustrates a block diagram of an example system that includes an example fused layer accelerator to accelerate processing of a convolutional neural network that includes at least one pyramid of fused CNN layers.

FIG. 5 illustrates a block diagram of an example system 500 that includes an example fused layer accelerator 502 to accelerate processing of a convolutional neural network that includes at least one pyramid of fused CNN layers. The system 500 includes the external memory 106 and the fused layer accelerator 502.

The external memory 106 stores a set of input feature maps associated with a certain convolutional neural network. The external memory 106 will also store a set of output feature maps after the fused layer accelerator 502 processes the certain convolutional neural network.

The fused layer accelerator 502 can be implemented as a FPGA, GPU, ASIC, or as another hardware implementation. Moreover, the fused layer accelerator 502 processes the certain convolutional neural network, reading a set of input feature maps and writing a set of output feature maps.

As illustrated in FIG. 5, the fused layer accelerator 502 includes fused convolutional layers 504, 514, . . . , 524, which provide fused dataflow as described, for example, hereinabove with reference to FIGS. 1-3D. The convolution layer 504 includes a buffer 506, a reuse unit 508, a compute unit 510, and a weights buffer 512. Similarly, the convolution layer 514 includes a buffer 516, a reuse unit 518, a compute unit 520, and a weights buffer 522. Finally, the convolution layer 524 includes a buffer 526, a reuse unit 528, a compute unit 530, and a weights buffer 532. It should be noted that one or more additional convolutional layers can be provided in the fused layer accelerator 502 for different convolutional neural networks.

The buffer 506 is configured to iteratively store a three-dimensional tile structure of the input feature maps that is read into the convolutional layer 504 of the fused layer accelerator 502. The reuse unit 508 is configured to work with the buffer 506 in managing reuse of any overlapping data in the three-dimensional tile structure, such that the buffer 506 iteratively reads and stores only new data while overlapping data is reused. The compute unit 510 is configured to process iteratively the three-dimensional tile structure stored in the buffer 506 by convolution of the input data in the three-dimensional tile structure with filters of weights for the input feature maps stored in the weights buffer 512. Moreover, the compute unit 510 is configured to generate a first intermediate three-dimensional tile structure for a first set of intermediate feature maps.

The buffer 516 of the convolutional layer 514 is configured to iteratively store the first intermediate three-dimensional tile structure that is received from the convolutional layer 504 for the first set of intermediate feature maps. The reuse unit 518 is configured to work with the buffer 516 in managing reuse of any intermediate overlapping data in the first intermediate three-dimensional tile structure, such that the buffer 516 iteratively computes the new intermediate data while overlapping data is reused. The compute unit 520 is configured to process iteratively the first intermediate three-dimensional tile structure stored in the buffer 516 by convolution of the new intermediate data in the first intermediate three-dimensional tile structure with associated filters of weights for the first intermediate feature maps stored in the weights buffer 522. Moreover, the compute unit 510 is configured to generate a second intermediate three-dimensional tile structure for a second set of intermediate feature maps.

The buffer 526 of the convolutional layer 524 is configured to iteratively store the second intermediate three-dimensional tile structure that is received from the convolutional layer 504 for the second set of intermediate feature maps. The reuse unit 528 is configured to work with the buffer 526 in managing reuse of any intermediate overlapping data in the second intermediate three-dimensional tile structure, such that the buffer 526 iteratively computes only the new data while overlapping data is reused. The compute unit 530 is configured to process iteratively the second intermediate three-dimensional tile structure stored in the buffer 526 by convolution of the input data in the second three-dimensional tile structure with associated filters of weights for the second intermediate feature maps stored in the weights buffer 532. Moreover, the compute unit 530 is configured to generate an associated output three-dimensional tile structure for a set of output feature maps.

The output buffer 534 receives and stores output intermediate three-dimensional tile structure for a set of output feature maps. The buffered output three-dimensional tile structure is written from the output buffer 534 to the external memory 106.

In view of the foregoing, the fused layer accelerator 502 repeatedly inputs successive three-dimensional tile structures of the input feature maps into the convolutional layer 504 of the fused layer accelerator 502, which are then processed through subsequent convolution layers 514, 524 of the fused layer accelerator 502, and outputs successive output three-dimensional tile structures for the output feature maps. This processing continues until all the input feature maps have been processed and output feature maps have been generated for the certain convolutional neural network.

It should be noted that the fused accelerator 502 can be pipelined in order to overlap the processing of the convolutional layers 504, 514, . . . , 524, which can mitigate idling of the foregoing convolutional layers and accelerate processing of the convolutional neural network layers. For example, processing of a three-dimensional tile structure for a second pyramid of the certain convolutional neural network can start as soon as the convolutional layer 504 completes processing of a three-dimensional tile structure for a first pyramid of the certain convolutional neural network. This pipelining can be used to allow execution of multiple pyramids for the certain convolutional neural network to be overlapped in time.

Figure 6:
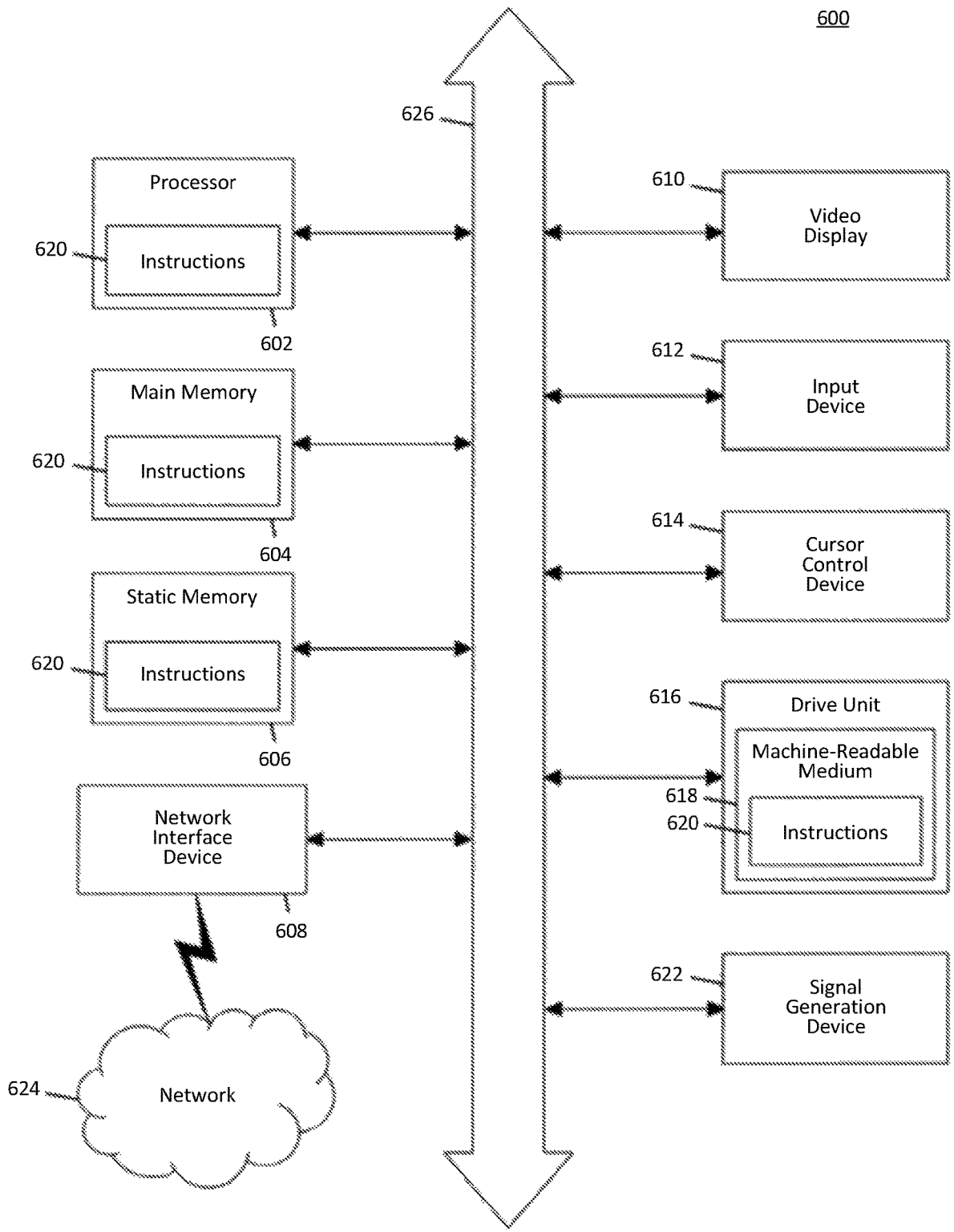
FIG. 6 is a block diagram of an example general computer system.

FIG. 6 is a block diagram of an example general computer system 600. The computer system 600 can include a set of instructions that can be executed to cause the computer system 600 to perform any one or more of the methods or computer-based functions as disclosed herein in FIGS. 1-5. The computer system 600, or any portion thereof, may operate as a standalone device or may be connected, e.g., using a network or other connection, to other computer systems or peripheral devices. For example, the computer system 600 may be the convolutional neural network 100, fused layer system 500, or the hardware accelerator 502, and may further be connected to other systems and devices, such as other computing system(s) via a network.

The computer system 800 may also be implemented as or incorporated into various devices, such as a personal computer (PC), a tablet PC, a personal digital assistant (PDA), a mobile device (e.g., smartphone), a palmtop computer, a laptop computer, a desktop computer, a communications device, a control system, a web appliance, or any other machine capable of executing a set of instructions (sequentially or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 6, the computer system 800 may include a processor 602, e.g., a central processing unit (CPU), a graphics-processing unit (GPU), or both. Moreover, the computer system 600 may include a main memory 804 and a static memory 606 that can communicate with each other via a bus 626. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive (or solid state) unit 616, a signal generation device 622, such as a speaker or remote control, and a network interface device 608.

In a particular embodiment or aspect, as depicted in FIG. 6, the disk drive (or solid state) unit 616 may include a computer-readable medium 618 in which one or more sets of instructions 620, e.g., software, can be embedded. Further, the instructions 620 may embody one or more of the methods or logic as described herein. In a particular embodiment or aspect, the instructions 620 may reside completely, or at least partially, within the main memory 604, the static memory 606, and/or within the processor 602 during execution by the computer system 600. The main memory 604 and the processor 602 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 620 or receives and executes instructions 620 responsive to a propagated signal, so that a device connected to a network 624 can communicate voice, video or data over the network 624. Further, the instructions 620 may be transmitted or received over the network 624 via the network interface device 608.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

The Abstract is provided to comply with 37 C.F.R. § 1.72(b) and will allow the reader to quickly ascertain the nature and gist of the technical disclosure of the present application. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus, the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description.

The invention claimed is:

1. A method of processing a convolutional neural network comprising a plurality of convolutional layers, the method comprising:
   determining a current pyramid from a plurality of pyramids capable of being determined for the convolutional neural network, the current pyramid defining a computational window that spans across the plurality of convolutional layers of the convolutional neural network, wherein the current pyramid includes within the computational window portions of the convolutional layers that are fused to provide data flow exploiting inter-data locality among the plurality of convolutional layers of the convolutional neural network;
   accessing for a convolutional layer of the current pyramid a current three-dimensional tile structure having a subset of a plurality of input data values in the set of input feature maps, each tile of the current three-dimensional tile structure corresponding to a respective feature map in a set of input feature maps, wherein a three-dimensional tile structure of each of the plurality of pyramids for the convolutional layer has a different subset of the plurality of input data values in the set of input feature maps;
   reusing intermediate convolved data values from a three-dimensional tile structure of a determined previous pyramid that are associated with first data values of the subset in the current three-dimensional tile structure, when the intermediate convolved data values of the previous three-dimensional tile structure overlap convolved data values that are to be computed in the current pyramid;
   computing intermediate non-overlapping convolved data values that are associated with second data values of the subset in the current three-dimensional tile structure using associated filters having a plurality of weight data values; and
   buffering reused intermediate convolved data values when available and computed intermediate convolved data values as intermediate data or output data.

2. The method of processing the convolutional neural network according to claim 1, wherein the method further comprises buffering the intermediate data in an on-chip buffer.

3. The method of processing the convolutional neural network according to claim 2, wherein the on-chip buffer is a cache or a scratchpad of a processor, a block random access memory of a field programmable gate array, or a static random access memory of an application specific integrated circuit.

4. The method of processing the convolutional neural network according to claim 1, wherein the method further comprises:
   determining whether there is a next convolutional layer to process in the current pyramid;
   selecting buffered intermediate data as the set of input feature maps; and
   repeating operations of accessing, reusing, computing, and buffering for the next convolutional layer in the current pyramid.

5. The method of processing the convolutional neural network according to claim 1, wherein the method further comprises:
   determining whether there is a next convolutional layer to process in the current pyramid; and writing buffered output data to a set of output feature maps when there is no next convolutional layer in the current pyramid to process.

6. The method of processing the convolutional neural network according to claim 5, wherein the buffered output data are written to the set of output feature maps in external memory.

7. The method of processing the convolutional neural network according to claim 1, wherein the method further comprises loading for a first convolutional layer the current three-dimensional structure in the current pyramid with the subset of the plurality of input data values in the set of input feature maps.

8. The method of processing the convolutional neural network according to claim 7, wherein the current three-dimensional tile structure of the current pyramid is loaded from external memory.

9. A system to process a convolutional neural network comprising a plurality of convolutional layers, the system comprising:
a processing device; and
a memory device storing instructions that, when executed by the processing device, cause the processing device to perform operations comprising:
determining a current pyramid from a plurality of pyramids capable of being determined for the convolutional neural network, the current pyramid defining a computational window that spans across the plurality of convolutional layers of the convolutional neural network, wherein the current pyramid includes within the computational window portions of the convolutional layers that are fused to provide data flow exploiting inter-data locality among the plurality of convolutional layers of the convolutional neural network;
accessing for a convolutional layer of the current pyramid a current three-dimensional tile structure having a subset of a plurality of input data values in the set of input feature maps, each tile of the current three-dimensional tile structure corresponding to a respective feature map in a set of input feature maps, wherein a three-dimensional tile structure of each of the plurality of pyramids for the convolutional layer has a different subset of plurality of input data values in the set of input feature maps;
reusing intermediate convolved data values from a three-dimensional tile structure of a determined previous pyramid that are associated with first data values of the subset in the current three-dimensional tile structure, when the intermediate convolved data values of the previous three-dimensional tile structure overlap convolved data values that are to be computed in the current pyramid;
computing intermediate non-overlapping convolved data values that are associated with second data values of the subset in the current three-dimensional tile structure using associated filters having a plurality of weight data values; and
buffering reused intermediate convolved data values when available and computed intermediate convolved data values as intermediate data or output data.

10. The system to process the convolutional neural network according to claim 9, wherein the operations further comprise buffering the intermediate data in an on-chip buffer.

11. The system to process the convolutional neural network according to claim 10, wherein the on-chip buffer is a cache or a scratchpad of a processor, a block random access memory of a field programmable gate array, or a static random access memory of an application specific integrated circuit.

12. The system to process the convolutional neural network according to claim 9, wherein the operations further comprise:
determining whether there is a next convolutional layer to process in the current pyramid;
selecting buffered intermediate data as the set of input feature maps; and
repeating operations of accessing, reusing, computing, and buffering for the next convolutional layer in the current pyramid.

13. The system to process the convolutional neural network according to claim 9, wherein the operations further comprise:
determining whether there is a next convolutional layer to process in the current pyramid; and
writing buffered output data to a set of output feature maps when there is no next convolutional layer in the current pyramid to process.

14. The system to process the convolutional neural network according to claim 13, wherein the buffered output data are written to the set of output feature maps in external memory.

15. The system to process the convolutional neural network according to claim 9, wherein the operations further comprise loading for a first convolutional layer the current three-dimensional structure in the current pyramid with the subset of the plurality of input data values in the set of input feature maps.

16. The system to process the convolutional neural network according to claim 15, wherein the current three-dimensional tile structure of the current pyramid is loaded from external memory.

17. An accelerator to process a convolutional neural network, the accelerator comprising a plurality of convolutional layers associated with the convolutional neural network and determining a current pyramid from a plurality of pyramids capable of being determined for the convolutional neural network, the current pyramid defining a computational window that spans across the plurality of convolutional layers of the convolutional neural network, wherein the current pyramid includes within the computational window portions of the convolutional layers of convolutional neural network that are fused to provide data flow exploiting inter-data locality among the plurality of convolutional layers, wherein a convolutional layer of the plurality of convolutional layers comprises:
an on-chip buffer configured to access for the convolutional layer of the current pyramid a current three-dimensional tile structure having a subset of a plurality of input data values in the set of input feature maps, each tile of the current three-dimensional tile structure corresponding to a respective feature map in a set of input feature maps, wherein the current three-dimensional tile structure of each of the plurality of pyramids for the convolutional layer has a different subset of the plurality of data values in the set of input feature maps;
a reuse unit, implemented in hardware, configured to reuse intermediate convolved data values from a three-dimensional tile structure of a determined previous pyramid that are associated with first data values of the subset in the current three-dimensional tile structure, when the intermediate convolved data values of the previous three-dimensional tile structure overlap convolved data values that are to be computed in the current pyramid; and compute unit, implemented in hardware, configured to compute intermediate non-overlapping convolved data values that are associated with second data values of the subset in the current three-dimensional tile structure using associated filters having a plurality of weight data values, and to buffer reused intermediate convolved data values when available and computed intermediate convolved data values as intermediate data in an on-chip buffer of a next convolutional layer or output data of an output on-chip buffer of the accelerator.

18. The accelerator to process the convolutional neural network according to claim 17, wherein the current three-dimensional tile structure is loaded from an external memory to the on-chip buffer.

19. The accelerator to process the convolutional neural network according to claim 17, wherein the buffered output data are written from the output on-chip buffer to a set of output feature maps in an external memory.

20. The accelerator to process the convolutional neural network according to claim 17, wherein the convolutional layers are processed in a pipeline to overlap processing of the plurality of convolutional layers.

* * * * *